United States Patent
Kumar et al.

(10) Patent No.: US 11,429,524 B2
(45) Date of Patent: Aug. 30, 2022

(54) OPTIMIZED HIERARCHICAL SCRATCHPADS FOR ENHANCED ARTIFICIAL INTELLIGENCE ACCELERATOR CORE UTILIZATION

(71) Applicant: INTERNATIONAL BUSINESS MACHINES CORPORATION, Armonk, NY (US)

(72) Inventors: Arvind Kumar, Chappaqua, NY (US); Swagath Venkataramani, Yonkers, NY (US); Ching-Tzu Chen, Ossining, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 256 days.

(21) Appl. No.: 16/785,708

(22) Filed: Feb. 10, 2020

(65) Prior Publication Data
US 2021/0248072 A1 Aug. 12, 2021

(51) Int. Cl.
*G06F 12/06* (2006.01)
*G06N 3/063* (2006.01)

(52) U.S. Cl.
CPC ......... *G06F 12/0646* (2013.01); *G06N 3/063* (2013.01)

(58) Field of Classification Search
CPC .................. G06F 3/06; G06F 2015/766; G06F 2009/4557; G06F 2009/45583;
(Continued)

(56) References Cited

U.S. PATENT DOCUMENTS 4,542,458 A * 9/1985 Kitajima ............... G06F 9/5016
710/18
6,799,253 B1 * 9/2004 Peterson ............... G06F 12/023
707/999.202
(Continued)

OTHER PUBLICATIONS

Cho, Doosan et al. "Adaptive Scratch Pad Memory Management for Dynamic Behavior of Multimedia Applications", IEEE Transactions on Computer-Aided Designs of Integrated Circuits and Systems, vol. 28, No. 4, Apr. 2009, pp. 554-567 (Year: 2009).*
(Continued)

*Primary Examiner* — William E. Baughman
(74) *Attorney, Agent, or Firm* — Griffiths & Seaton PLLC

(57) ABSTRACT

Various embodiments are provided for optimized placement of data structures in a hierarchy of memory in a computing environment. One or more data structures may be placed in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step. The second scratchpad memory is positioned between the external memory and the first scratchpad memory at one or more intermediary layers.

18 Claims, 10 Drawing Sheets

(58) Field of Classification Search
CPC ... G06F 2009/45595; G06F 2209/5022; G06F 2111/10; G06F 2201/81; G06F 2201/88; G06F 2201/885; G06F 30/20; G06F 2201/86; G06F 40/10; G06F 40/106; G06F 40/205; G06F 2212/00; H04L 65/4084; H04L 65/80; G06N 20/00; G06N 5/022; G06N 5/02; G06N 5/04; G06N 3/0472; G06N 7/005; G06N 3/02; G06N 3/0454; G06N 3/08; G06N 5/042; G06N 5/046

See application file for complete search history.

(56) References Cited

U.S. PATENT DOCUMENTS

| | | | | |
|---|---|---|---|---|
| 8,706,964 | B1* | 4/2014 | Koh | G06F 12/0888 |
| | | | | 711/118 |
| 10,649,914 | B1* | 5/2020 | Caccamo | G06F 9/445 |
| 10,725,837 | B1* | 7/2020 | Dash | G06F 9/544 |
| 2011/0080404 | A1* | 4/2011 | Rhoades | G06T 17/20 |
| | | | | 345/423 |
| 2012/0078980 | A1* | 3/2012 | Qiao | G06F 16/24556 |
| | | | | 707/812 |
| 2015/0106578 | A1* | 4/2015 | Warfield | G06F 3/0631 |
| | | | | 711/158 |
| 2016/0342526 | A1* | 11/2016 | Chang | G06F 12/1063 |
| 2018/0101483 | A1* | 4/2018 | Catthoor | G06F 12/1009 |

OTHER PUBLICATIONS

Avissar, Oren, Rajeev Barua, and Dave Stewart. "An optimal memory allocation scheme for scratch-pad-based embedded systems." ACM Transactions on Embedded Computing Systems (TECS) 1.1 (2002): 6-26. (Year: 2002).*

Issenin et al. "Data-Reuse-Driven Energy-Aware Cosynthesis of Scratch Pad Memory and Hierarchical Bus-Based Communication Architecture for Multiprocessor Streaming Applications," in IEEE Transactions on Computer-Aided Design of Integrated Circuits and Systems, vol. 27, No. 8, pp. 1439-1452, Aug. 2008 (Year: 2008).*

Adler, Michael, et al., "LEAP Scratchpads: Automatic Memory and Cache Management for Reconfigurable Logic," FPGA'11, ACM, pp. 25-28.

Perarnau, Swann, et al., "Exploring Data Migration for Future Deep-Memory Many-Core Systems," 2016 IEEE International Conference on Cluster Computing (Cluster), IEEE, 2016, 9 pages.

Shukla, Sunil, et al., "A Scalable Multi-TeraOPS Core for AI Training and Inference," IEEE Solid-State Circuits Letters, v.1, n.1, Jan. 2018, 4 pages.

* cited by examiner

OPTIMIZED HIERARCHICAL SCRATCHPADS FOR ENHANCED ARTIFICIAL INTELLIGENCE ACCELERATOR CORE UTILIZATION

BACKGROUND OF THE INVENTION

Field of the Invention

The present invention relates in general to computing systems, and more particularly to, various embodiments for providing optimized hierarchical scratchpads for enhanced artificial intelligence ("AI") accelerator core utilization a computing environment by a processor.

Description of the Related Art

In today's society, consumers, business persons, educators, and others use various computing network systems with increasing frequency in a variety of settings. Computer systems may be found in the workplace, at home, or at school. Computer systems may include data storage systems, or disk storage systems, to process and store data. In recent years, both software and hardware technologies have experienced amazing advancement. With the new technology, more and more functions are added, and greater convenience is provided for use with these computing systems.

SUMMARY OF THE INVENTION

Various embodiments for optimized hierarchical scratchpads for enhanced artificial intelligence ("AI") accelerator core utilization using one or more processors in a computing environment are provided. In one embodiment, by way of example only, a method for optimally placing of data structures in an optimized hierarchy of memory in a computing environment, again by a processor, is provided. One or more data structures may be placed in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step. The second scratchpad memory is positioned between the external memory and the first scratchpad memory at one or more intermediary layers.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
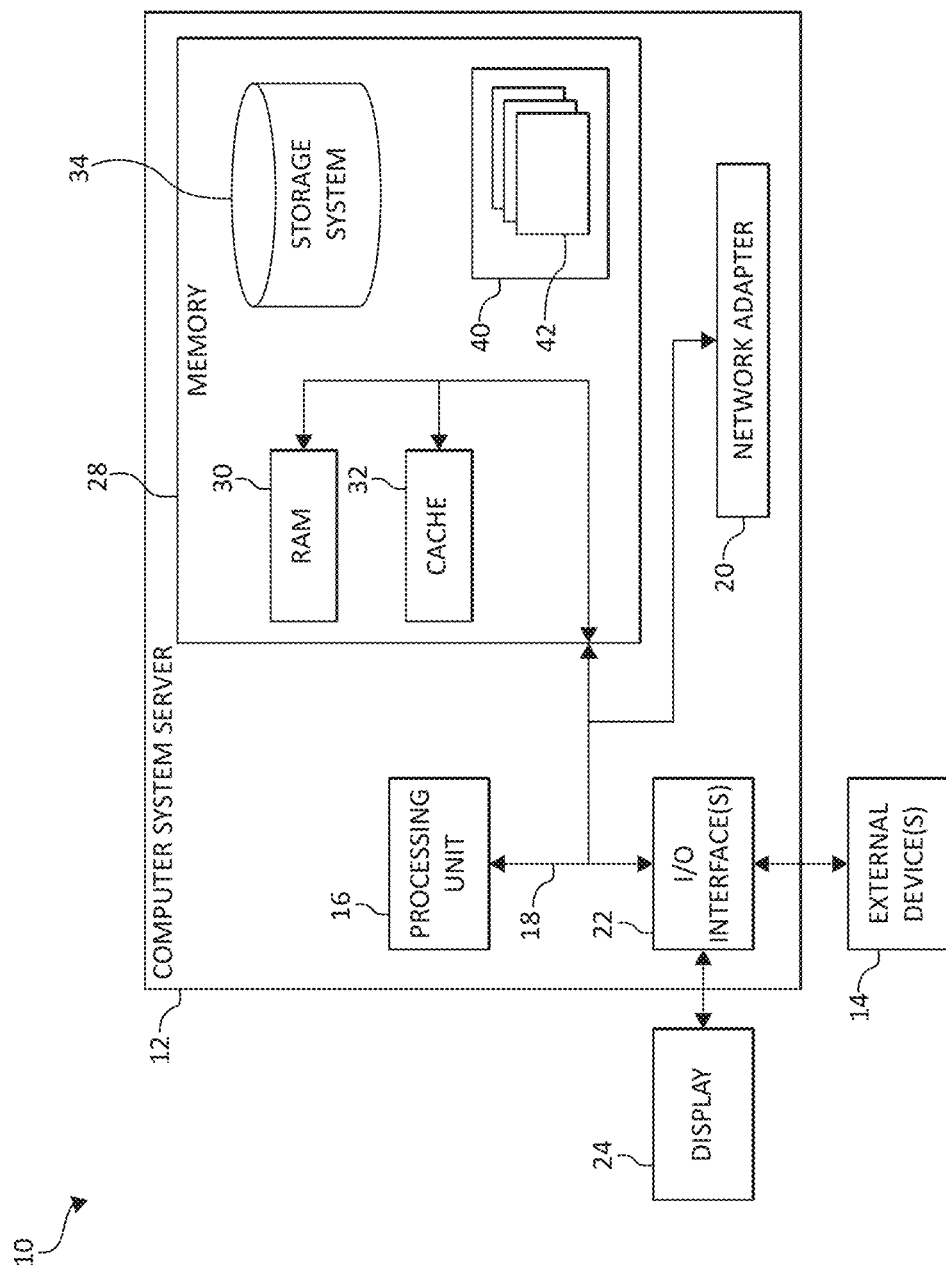
FIG. 1 is a block diagram depicting an exemplary computing node according to an embodiment of the present invention.

The present invention relates generally to the field of artificial intelligence ("AI") such as, for example, machine learning and/or deep learning. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Overall, deep learning has led to major advances in optimizing decision making and extracting business value from unstructured data such as, for example, images, audio, videos and texts. However, while deep learning achieves increased computing performance on a wide variety of data types and tasks, some challenges, data structure placement and memory allocations issues of Deep Neural Networks (DNNs) exists.

For example, the increasing prevalence of AI workloads is driving the need for graphics processing units ("GPUs") and specialized accelerators with high bandwidth interconnectivity to memory. As these accelerators continue to improve, overall system performance will suffer unless the external bandwidth is able to supply data to the compute engines fast enough. Typically, this is done by addition of one or more high bandwidth memories ("HBMs") through heterogeneous integration techniques. However, even multiple HBMs are un able to supply sufficient bandwidth for many deep learning algorithms. Furthermore, multiple HBMs come with a substantial penalty in form factor, power, and cost. One method to alleviate this memory bottleneck is the judicious use of an on-chip memory scratchpad (e.g., an "S1" scratchpad as denoted herein and the associated Figs.) to enable data reuse. While highly effective in improving core utilization (e.g., accelerator core, central processing core "CPU," etc.), core under-utilization due to memory bandwidth remains a significant performance detractor.

For example, consider performing a DNN training problem performed on a network of 16 accelerator chips, each with 4 HBMs that indicates that system performance is memory-bound rather than compute-bound (i.e., still responding strongly to increases in external bandwidth. Such operations and results may yield substantial system performance benefit by increasing the external bandwidth from the present state of the art (HBM, 256 gigabytes "GB" per second "GB/s"). However, adding external bandwidth simply by adding multiple external memory units (e.g., HGM) may experience/face severe constraints (e.g., costly and impractical, which may be limited by silicon interposer sizes).

Thus, to overcome this challenge, the present invention provides a novel solution by optimizing hierarchical scratchpads for enhanced AI accelerator core utilization using one or more processors in a computing environment are provided. In one embodiment, by way of example only, one or more data structures may be placed in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step. The second scratchpad memory may be positioned between the external memory and the first scratchpad memory (e.g., the S1 scratchpad) at one or more intermediary layers.

In an additional aspect, one or more additional scratchpad levels may be activated, placed, and/or inserted between a private scratchpad (e.g., an on-chip memory scratchpad, the S1 scratchpad, or a first scratchpad) and an external memory. The hierarchical scratchpads may be activated, managed, and/or controlled to achieve maximum performance to optimally fill the hierarchical scratchpad with data structures of a deep neural network. In one aspect, a single additional scratchpad (e.g., a second scratchpad or "S2" as also denoted herein and the associated Figs.) may be activated, placed, and/or inserted between the private scratchpad (the S1 scratchpad) and an external memory.

Also, as used herein, a computing system may include large scale computing called "cloud computing" in which resources may interact and/or be accessed via a communications system, such as a computer network. Resources may be software-rendered simulations and/or emulations of computing devices, storage devices, applications, and/or other computer-related devices and/or services run on one or more computing devices, such as a server. For example, a plurality of servers may communicate and/or share information that may expand and/or contract across servers depending on an amount of processing power, storage space, and/or other computing resources needed to accomplish requested tasks. The word "cloud" alludes to the cloud-shaped appearance of a diagram of interconnectivity between computing devices, computer networks, and/or other computer related devices that interact in such an arrangement.

It should be noted that one or more computations or calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
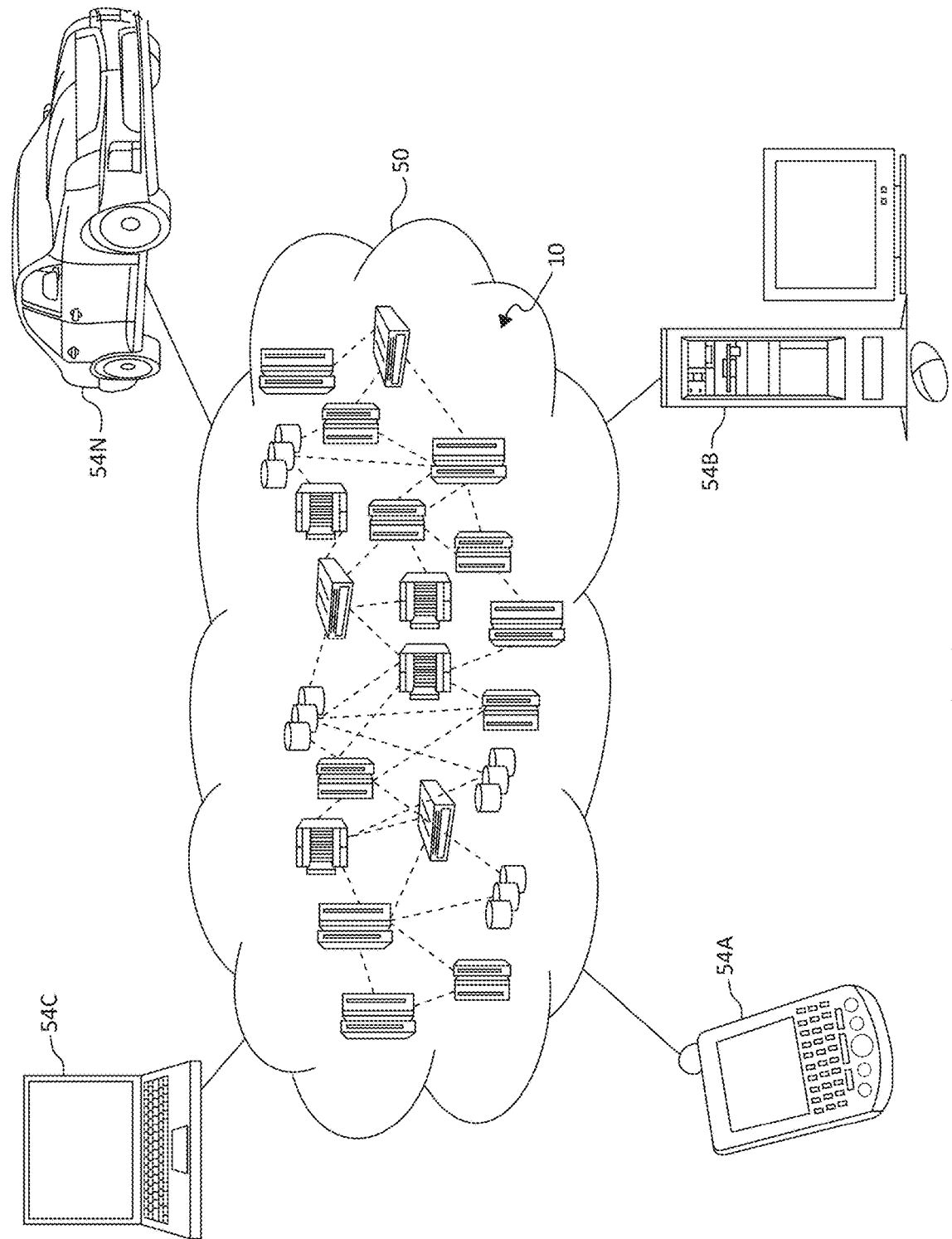
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
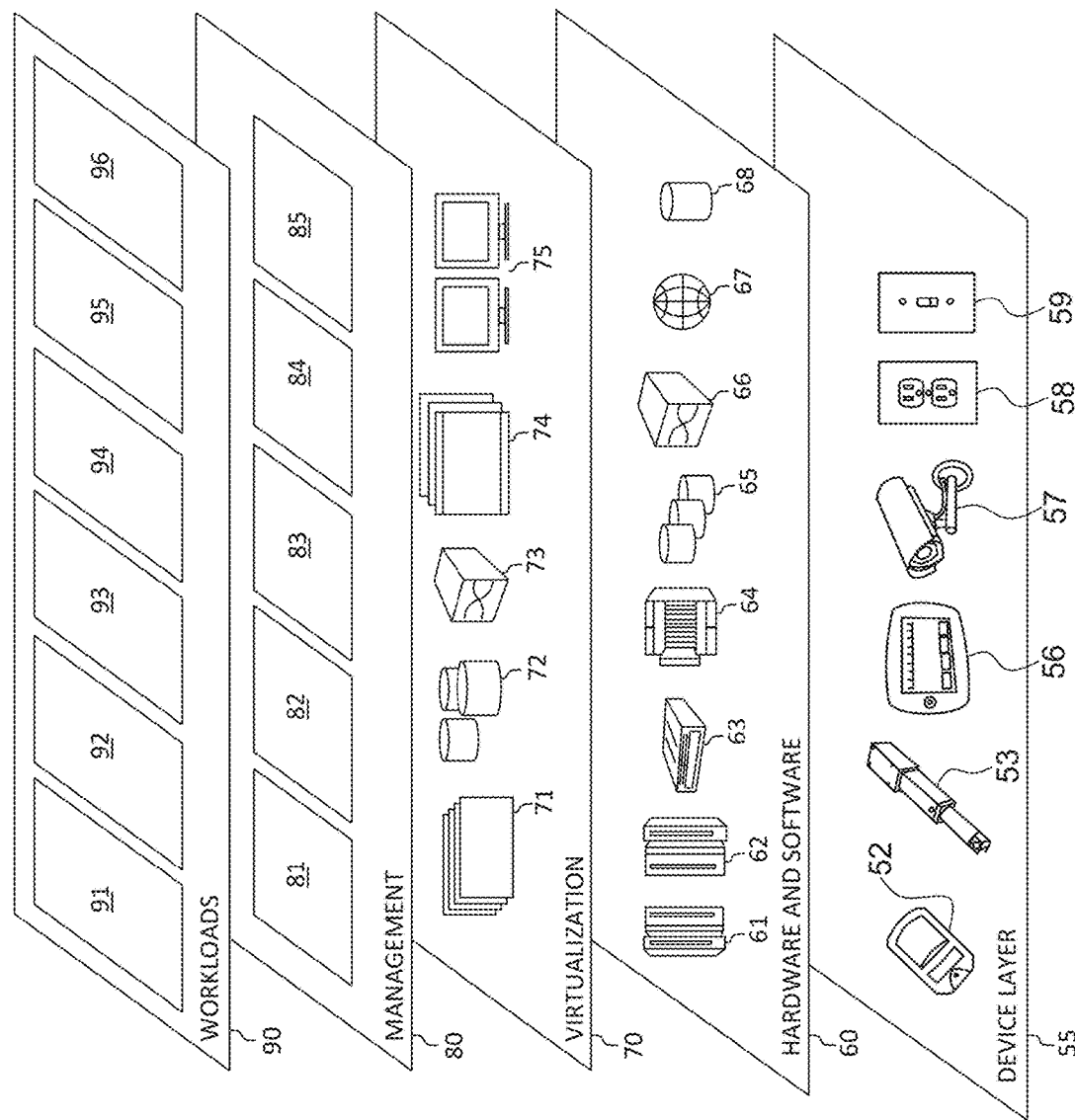
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for providing and using optimized hierarchical scratchpads. In addition, workloads and functions 96 for providing and using optimized hierarchical scratchpads may include such operations as data analytics, data analysis, and as will be further described, memory allocation functionality. One of ordinary skill in the art will appreciate that the workloads and functions 96 for providing and using optimized hierarchical scratchpads may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
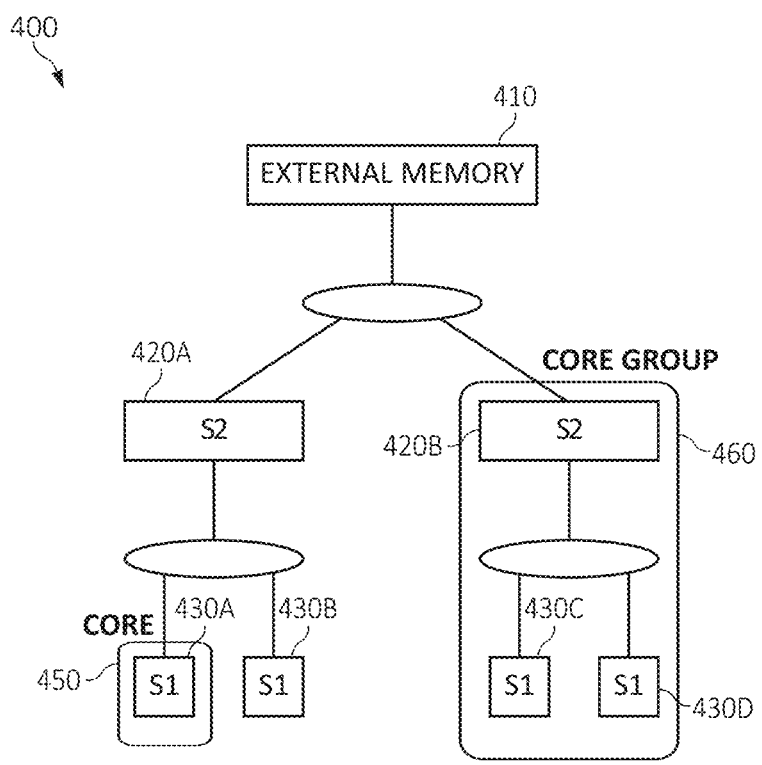
FIG. 4 is an additional block diagram depicting optimized hierarchical memory architecture in which aspects of the present invention may be realized.

Turning now to FIG. 4, a block diagram depicts an optimized hierarchical memory architecture 400 in which illustrative embodiments may be implemented. In one aspect, one or more of the components, modules, services, applications, and/or functions described in FIGS. 1-3 may be used in FIG. 4. For example, the optimized hierarchical memory architecture 400 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-3) is omitted for sake of brevity.

As illustrated, the optimized hierarchical memory architecture 400 may include an external memory 410, one or more second scratchpads such as, for example, scratchpads 420A-B or "S2" scratchpad, one or more first scratchpads such as, for example, scratchpads 430A-D or "on-chip memory scratchpad" or "S1" scratchpad.

In one aspect, the second scratchpads 420A-B (e.g., a second level of scratchpad called "S2") may be activated, managed, placed, and/or inserted between the existing on-chip scratchpad (e.g., scratchpads 430A-D or "on-chip memory scratchpad" or "S1" scratchpad) and the external memory 410. The second scratchpads 420A-B (e.g., the S2 scratchpads) may be partitioned into a number of core groups such as, for example, core groups 460 (e.g., accelerator core groups) such that all cores such as, for example, core 450 (e.g., an accelerator core) belonging to a core group such as, for example, core group 460 share a segment of the S2 scratchpad (e.g., one or more of the second scratchpads 420A-B). Each core 450 may include a private S1 scratchpad (e.g., one of the first scratchpads 430A-D or "on-chip memory scratchpad").

In one aspect, by way of example only, the S2 scratchpad (e.g., one or more of the second scratchpads 420A-B) may be realized as an embedded memory on chip, as a memory joined by three-dimensional ("3D") stacking to the accelerator, or as a separate chip joined by a high-bandwidth connection to an accelerator (not shown for illustrative convenience). Thus, the optimized hierarchical memory architecture 400 provides for optimizing the data structures, into the S1 and/or S2 scratchpads, that are generated during training operations.

Figure 5:
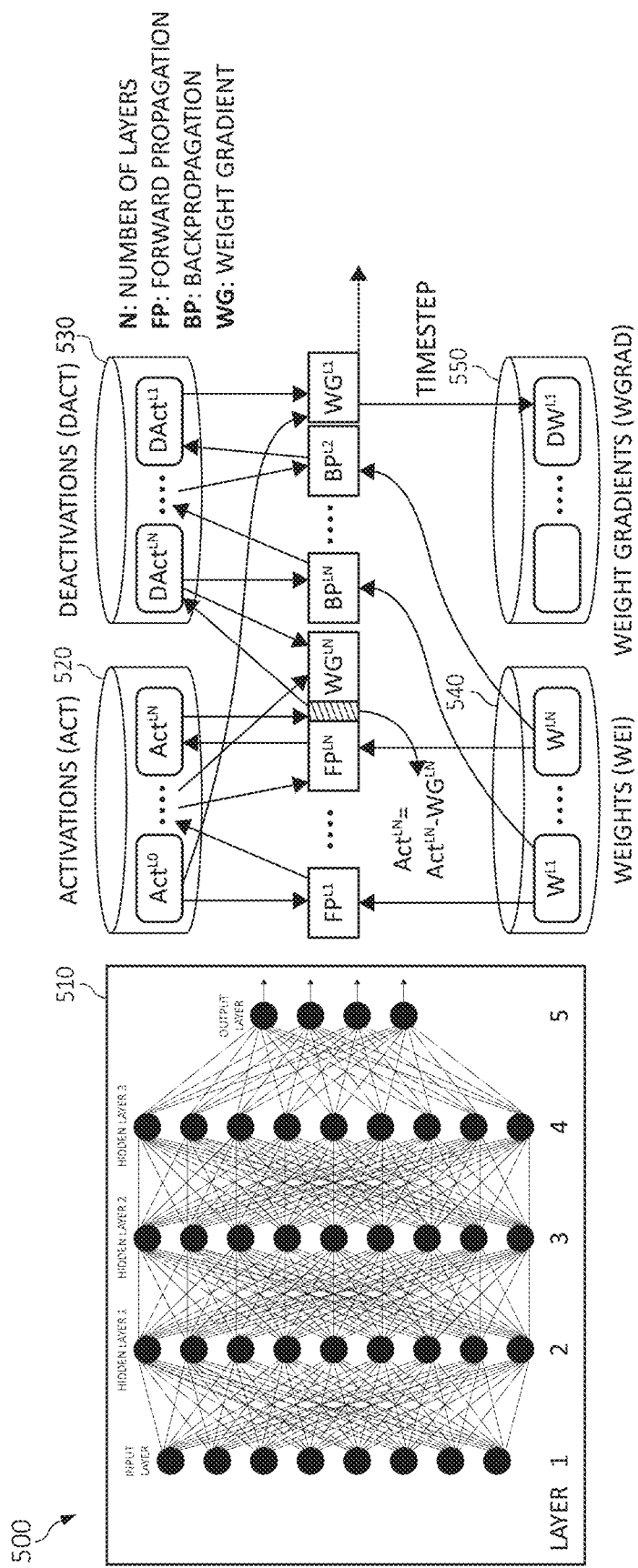
FIG. 5 is an additional block diagram depicting a deep neural network architecture in which aspects of the present invention may be realized.

Turning now to FIG. 5, a block diagram depicts an architecture of a deep neural network ("DNN") 500 in which illustrative embodiments may be implemented. In one aspect, one or more of the components, modules, services, applications, and/or functions described in FIGS. 1-4 may be used in FIG. 5. For example, the DNN 500 may be components that may be incorporated, controlled, accessed, managed, and/or included in a computer system/server 12 of FIG. 1. In one aspect, repetitive description of like elements, components, modules, services, applications, and/or functions employed in other embodiments described herein (e.g., FIGS. 1-4) is omitted for sake of brevity.

As depicted, the DNN 500 may include one or more layers ("N layers") such as, for example, layers 1-5 (e.g., where some are convolutional layers and other layers may be fully connected). The DNN 500 may be trained using one or more operations such as, for example, backpropagation ("BP"). During the training, a large number of data structures may be generated that are associated with each layer (e.g., layers 1-5) such as, for example, weights ("WEI") 540, activations ("ACT") 520, deactivations ("DACT") 530, and weight gradients ("WGRAD" or "WG") 550.

During the process of using backpropagation ("BP") for training the DNN 500, one or more compute passes may occur per layer, for example, layer 1 ("L1"), layer 2, ("L2"), layer 3, ("L3"), layer 4, ("L4"), and/or layer 5, ("L5") (or layer N, ("LN"), where "N" is a positive integer). The compute passes may include a forward pass (e.g., forward propagation "FP"), a backward pass (e.g., backpropagation "BP"), and a weight update pass (e.g., weight-gradient). By way of example only, various dependencies (shown in FIG. 5 only for illustrative purposes and not be construed as limiting in nature) occurring during each time step are depicted for the weights ("WEI") 540, the activations ("ACT") 520, the deactivations ("DACT") 530, and the weight gradients (WGRAD" or "WG") 550 while training the DNN 500 using the backpropagation ("BP").

For example, initially, during a forward pass ("FP"), the weights of each layer (WEI 540) are used to generate the activations (ACT 520). As time progresses at each time step and the FP operations are completed at each of the layers, a series of alternating steps may occur between the weight upgrade steps (e.g., WGRAD or WG 550) and the backward passes (e.g., backpropagation), which also include various dependencies between each other. For example, the weight upgrade steps (e.g., WGRAD or WG 550) may require one or more of the activations (e.g., the ACT 520) generated from the forward pass FP, which then generate the one or more of the deactivations (e.g., the DACT 530) may be generated from the BP.

Thus, as described herein, the optimized hierarchical memory architecture 400 provides for optimizing the data structures of FIG. 5, into the S1 and/or S2 scratchpads, that are generated during a training operations. Thus, the present invention provides optimal placement of data structures in the optimized hierarchical memory architecture 400 by applying one or more factors such as, for example, 1) a total memory capacity and bandwidth available, 2) a level of reuse of each data structure such as, for example, if a weight matrix associated with a layer is heavily reused, the data structure may be maintain away from the processing elements since its data transfer time can be amortized over multiple reuses, whereas a lightly reused layer should be kept/maintained close to the processing elements, in order to minimize its data transfer time relative to its computation time, 3) how many operations utilize that specific data structure, 4) the temporal duration that the data structure needs to be held in the scratchpad (e.g., how long the data structures are required to be stored in a particular scratchpad), and/or 5) one or more characteristics of the competing data structures that co-exist at the same timesteps.

Figure 6:
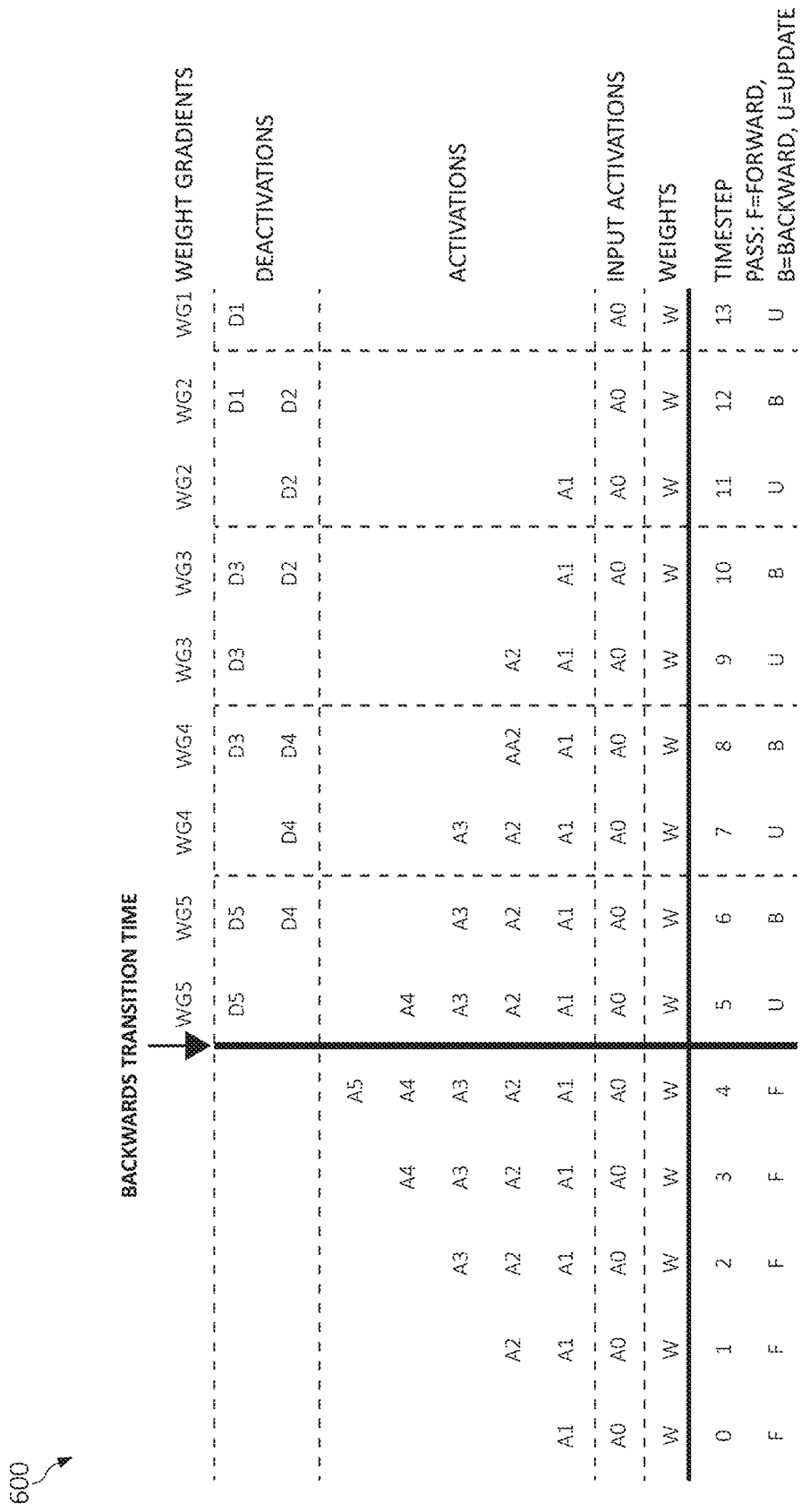
FIG. 6 is an additional block diagram depicting an exemplary operation for optimal placement of data structures in an optimized hierarchy of memory in which aspects of the present invention may be realized.

Turning now to FIG. 6, diagram 600 depicts an exemplary functionality of an operation for optimal placement of data structures in an optimized hierarchy of memory in a DNN (e.g., DNN 500 of FIG. 5). In one aspect, one or more of the components, modules, services, applications, and/or functions described in FIGS. 1-5 may be used in FIG. 6. In one aspect, repetitive description of like elements, components, modules, services, applications, and/or functions employed in other embodiments described herein (e.g., FIGS. 1-5) is omitted for sake of brevity.

As depicted in FIG. 6, the same data structure may be utilized by different layers in different timesteps. Therefore, the operations for optimal placement of data structures in an optimized hierarchy of memory may maintain/keep a data structure in a local memory until it is needed. In one aspect, the temporal nature and duration of each generated data structure may be learned and understood in order to optimize its placement in the memory hierarchy.

For example, consider the temporal duration of data structures in the 5-layer DNN 500 of FIG. 5 that are depicted in FIG. 6, where "A1" means activations produced by layer 1, "A2" means activations produced by layer 2, "A3" means activations produced by layer 3, "A4" means activations produced by layer 4, and "A5" means activations produced by layer 5.

That is, in one aspect, diagram 600 depicts a pictorial representation of when the data structures come into play (by way of example only) by staring with a forward pass ("F" or "FP") operation as depicted in FIG. 6. As the forward pass ("F") operations progress along the timestep the number of activations (e.g., A1-A5) are built up at various timesteps.

After the forward pass ("F") passes are completed on the five layers, for example, the weighted updated pass ("U" or "WG" as depicted in FIG. 5) may be alternated with the backwards ("B" or "BP") operations. During occurrences of the weighted updated pass ("U") and the backwards ("B") operations along the timestep, various deactivations (e.g., D1-D5) and weight gradients (e.g., WG1-WG5) may be generated, at the various timesteps.

Again, as mentioned previously, as time progresses at each time step (e.g., 0-13 in FIG. 6) and the forward passes ("F") are completed at each of the layers, a series of alternating steps may occur between the weighted updated passes ("U") and the backward passes ("B") (e.g., backpropagation), which also include various dependencies between each other. For example, the weight update passes ("U") may require one or more of the activations generated from the forward passes ("F") as input (e.g., input activations), which then generate the one or more of the deactivations may be generated from the backward passes ("B").

Figure 7A:
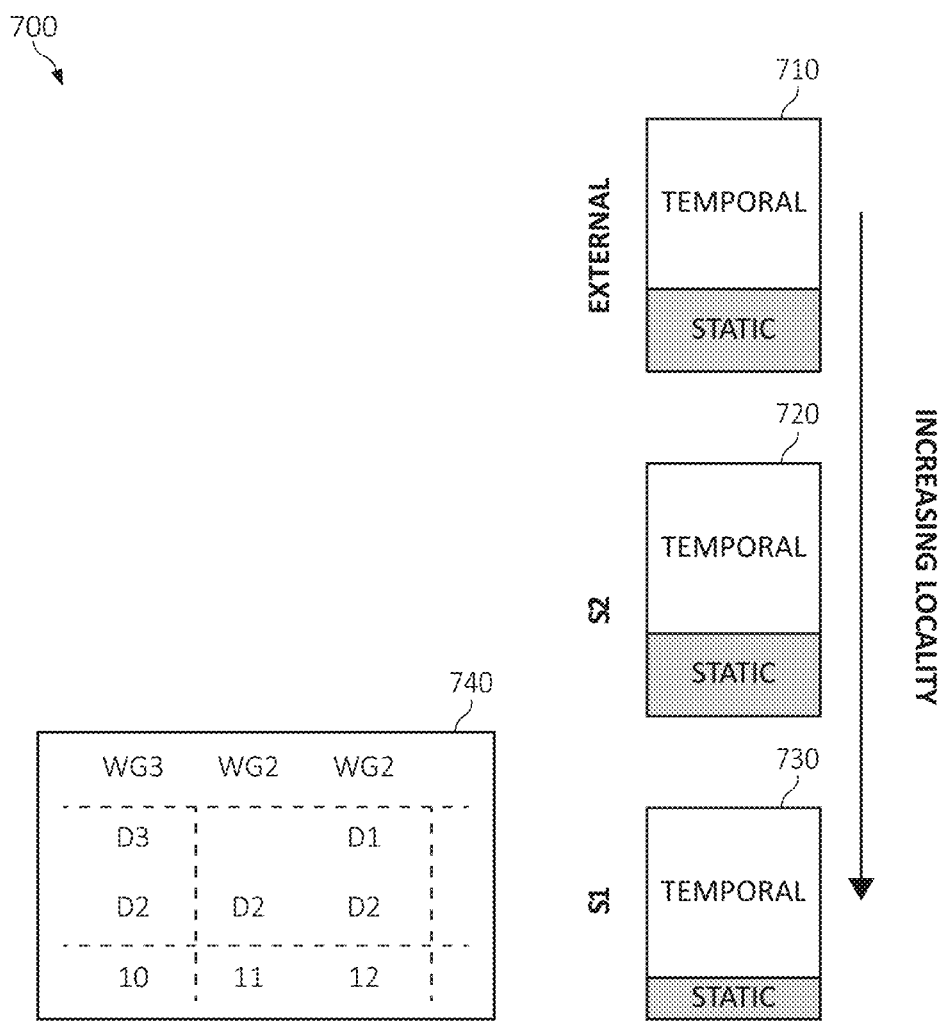
FIG. 7A is an additional block diagram partitioned optimized hierarchical memory for optimal placement of data structures in which aspects of the present invention may be realized.
Figure 7B:
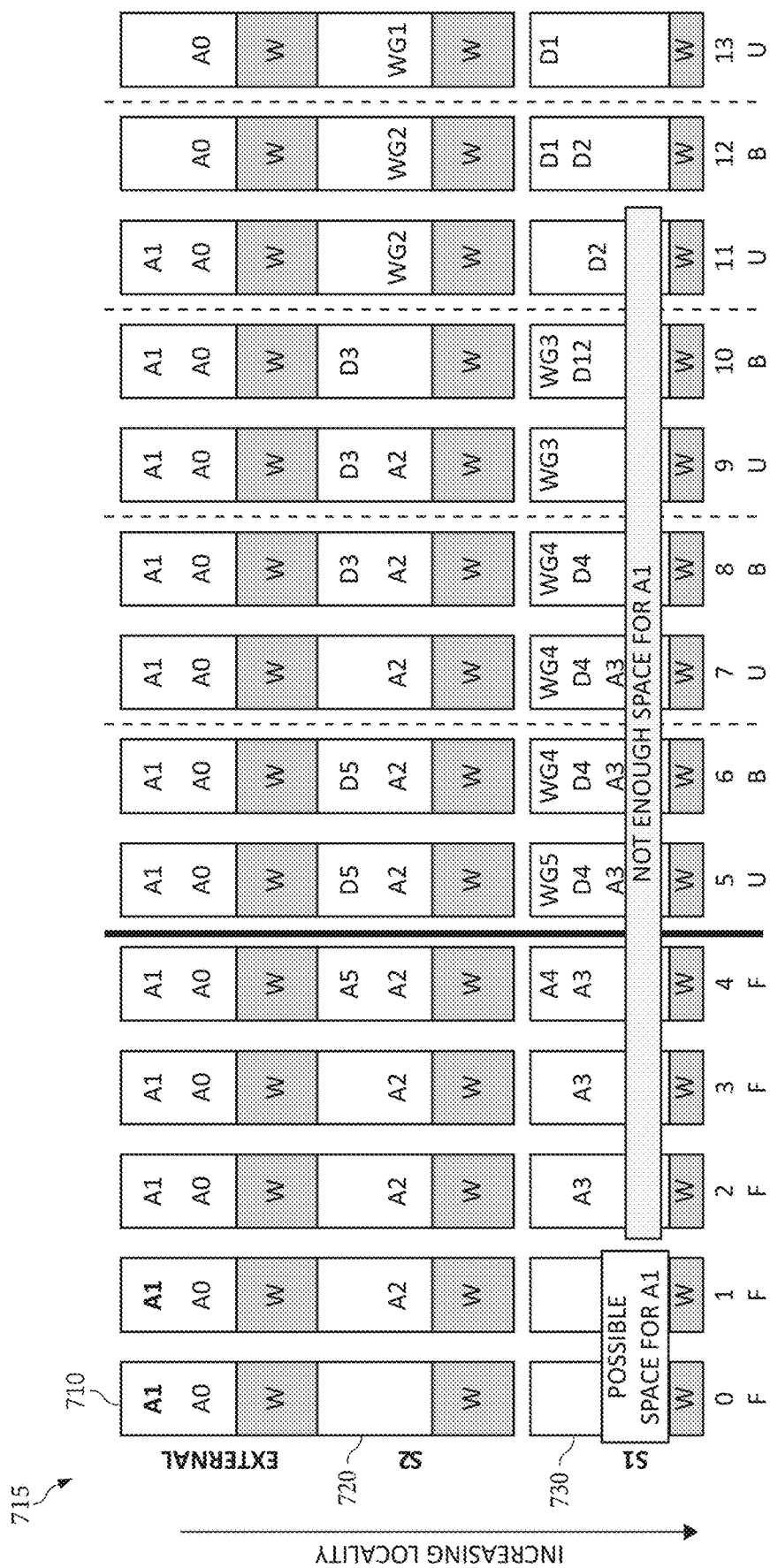
FIG. 7B-7C is an additional block diagram depicting an exemplary operation for optimal placement of data structures in an optimized hierarchy of memory in which aspects of the present invention may be realized.
Figure 7C:
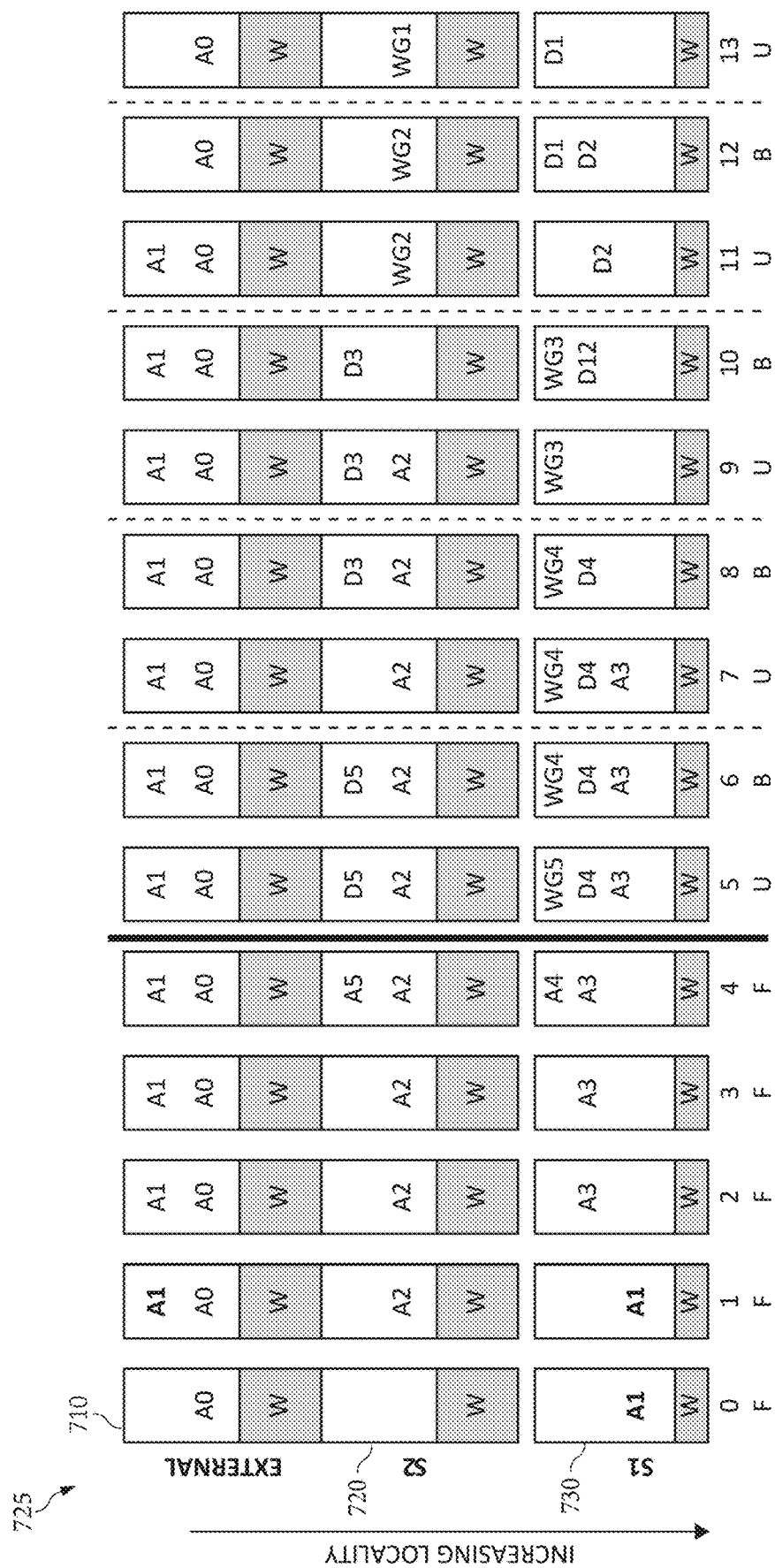

Turning now to FIG. 7A-7C, a block diagram of exemplary functionality a partitioned optimized hierarchical memory 700 of FIG. 7A for optimal placement of data structures is depicted. The partitioned optimized hierarchical memory 700 of FIG. 7A is also depicted in FIGS. 7B-7C.

As shown, the various blocks of functionality are depicted with arrows designating the blocks depicting the partitioned optimized hierarchical memory 700 relationships with each other and to show process flow. Additionally, descriptive information is also seen relating each of the functional blocks of the partitioned optimized hierarchical memory 700. As will be seen, many of the functional blocks may also be considered "modules" of functionality, in the same descriptive sense as has been previously described in FIGS. 1-6. In one aspect, one or more of the components, modules, services, applications, and/or functions described in FIGS. 1-6 may be used in FIG. 7A-7C. In one aspect, repetitive description of like elements, components, modules, services, applications, and/or functions employed in other embodiments described herein (e.g., FIGS. 1-6) is omitted for sake of brevity.

As depicted in FIG. 7A (also depicted in FIGS. 7B-7C), in a first step, each memory (e.g., S1 scratchpad 730, S2 scratchpad 720, and/or external memory 710) may be partitioned into a section ("static") for static data structures (e.g., weights), which are required for all timesteps and temporal data structures (e.g., activations, deactivations, weight gradients) that are only used for some timesteps. The partitioning of the S1 scratchpad 730, the S2 scratchpad 720, and/or the external memory 710 can be made into a parameter, which can be optimized depending on a network. In one aspect, the S1 scratchpad 730 is closest to the accelerator cores with the S2 scratchpad 720 being next closest (also in a middle layer), and the external memory 710 being furthest away from a core.

In a second step, weights (e.g., weight data structures) may fill up the static data structures section ("static"). In one aspect, placement of the data structures may be prioritized based on a figure of merit ("FOM") in order of increasing locality of the memory to the processing elements. It should be noted that the FOM may be used to decide where data structures are placed in the partitioned optimized hierarchical memory 700. In other words, for the partitioned optimized hierarchical memory 700, data structures with the highest FOM will be preferentially placed first in the S1 scratchpad 730 until it fills up completely and then in S2 scratchpad 720 until it fills up completely, and then finally the external memory 710.

To further explain the FOM, consider the following where a heuristic-driven operation may be used to pin data structures based on the following key characteristics (or "factors") of a given data structure (D). 1) A first key characteristic may be an "unused liveness" characteristic or, said differently, the duration for which the data structure should be retained unused, in a scratchpad, and this characteristic may be considered and used. Data structures that are long-living, but used sporadically only in a few intermittent time-steps can "monopolize" space that might otherwise be used to hold multiple short-lived data structures that are more performance-critical. Unused liveness may be determined/computed from a node execution order by counting the number of nodes that do not use the data structure between its first and last occurrence.

2) A second key characteristic may be "memory-boundness", or how memory-bound is a given data structure considering all the operations in which it is used is another key characteristics/factor of the FOM. Memory-boundness may be imperative so as to pin more memory-bound data structures on-chip. In one aspect, the memory-boundness of a data structure may be inferred by determining a maximum reuse that each data structure element receives across all operations that is used. For example, in case of a convolution operation, each element of input activation may be reused along all output channels and filter elements. In point-wise operations, similar to activation functions, a reuse may equal one (e.g., reuse=1), as each input element is used only once to compute the corresponding output element. Thus, memory boundness is inversely proportional to reuse such that the more an element is reused within an operation, the less likely it is to make the operation memory-bound.

3) A third key characteristic is the impact (e.g., positive impact and/or negative impact) or how costly are the operations that use a particular data structure. If the operations constitute only a small fraction of the total DNN operations, pinning the data structure on-chip may likely have little impact on the overall execution time. Thus, the impact may be measured as the sum of all operations the data structure is used divided by the total number of operations in the DNN (e.g., DNN 500). Thus, each of the above factors/characteristics may be merged into a single FOM metric such that small unused liveness, large memory-boundness and high impact are good candidates to pin the data structure in a memory of high locality.

In a third step, other temporal data structures may be placed in the partitioned optimized hierarchical memory 700. For example, weight gradients (e.g., WG1-5), deactivations (e.g., D1-D5), and any other temporal data structures may be placed in the temporal data structures section of the S1 scratchpad 730, the S2 scratchpad 720, and the external memory 710.

Because of the different time durations of these structures in the scratchpads (e.g., the S1 scratchpad 730, the S2 scratchpad 720), it is necessary to prioritize placement into memories of highest locality based on a ranking of the ratio of 'cost' to 'benefit' (e.g., what is the cost of keeping a data structure in local memory (e.g., the S1 scratchpad 730) as compared to what is the benefit of keeping the data structure in the local memory). The 'benefit' is given by the FOM of the data structure (which depends on its reuse), while the "cost" may be a sum of the FOMs of all other data structures that compete for the same space, which may be weighted by the actual overlap of the data structures. For example, as shown in block 740, D2 competes for placement in the optimized hierarchical memory 700 with WG3 and D3 at timestep 10, WG2 at timestep 11, and D1 and WG2 at timestep 12. Thus the cost of D2 being retained in the local memory (e.g., S1 scratchpad 730) is a weighted sum of the FOMs of D3, D1, WG3, and WG2.

In a fourth step, the activations data structures may be preferentially placed in the partitioned optimized hierarchical memory 700. For example, the activations may be preferentially placed into memories of highest locality based on the shortness of their duration, which may be learned by working backwards from the backwards transition time (e.g., A5 will have priority due to the shortness of its duration then A4, A3, etc.).

It should be noted that at the start of the time step (e.g., 0-13 of FIGS. 7B-7C), those data structures having the shortest duration may be prioritized and placed in the private, local memory (e.g., S1 scratchpad 730), which is depicted in FIGS. 7B-7C, where A3 and A4 at time step 2-4 are placed in the S1 scratchpad 730 and A1 may be removed and placed into the external memory 710, particularly since A3 and A4 are approaching the backward pass time step where the forward pass operations are switched to the backward pass and update pass operations and need A3 and A4 again. However, once the initial assignment of the data structures are completed, there may be vacant space for the data structures in the partitioned optimized hierarchical memory 700.

In a fifth step, as depicted in diagrams 715 and 725 FIGS. 7B and 7C, once all data structures have been placed in the partitioned optimized hierarchical memory 700, there may still be space leftover which can yield further optimization. For example, activation A1 may be low priority for placement in S1 scratchpad 730 due to its long duration. (It should be noted that repeated numbering of the S1 scratchpad 730, the S2 scratchpad 720, and the external memory 710 in FIGS. 7B and 7C is avoided for each of the progressive time steps for illustrative clarity and is only labeled at time step 0.) However, activation A1 is only needed during timesteps 0 and 1. As such, there may be possible space for A1 in S1 scratchpad 730. If there is space in S1 scratchpad 730 and/or the S2 scratchpad 720, A1 can be maintained in a local memory during the timestep. FIG. 7B depicts, by way of example only, available space for A1 only in timesteps 0 and 1 and not enough space for A1 in timesteps 2-13.

Continuing on with the fifth step, as illustrated in FIG. 7C, one or more data structures (e.g., A1) may be relaxed (e.g., placed) to more local memory if capacity permits. That is, one or more data structures may be relaxed to a first scratchpad memory, a second scratchpad memory, an external memory, or a combination thereof based on a capacity level. In this example, A1 produced at timestep 0 may be maintained/held in S1 scratchpad 730, although its permanent home is in the external memory 710. This improves performance of timestep 0, as a write to external memory 710 is avoided. At timestep 1, A1 may then be written from the S1 scratchpad 730 to the external memory 710 as it is consumed by the cores. It should be noted that, this does not impose additional penalty on timestep 1 because if this data-structure were in external memory 710, then timestep 1 should read A1 from the external memory 710. Rather, in this case, a read operation is substituted with a write operation.

Figure 8:
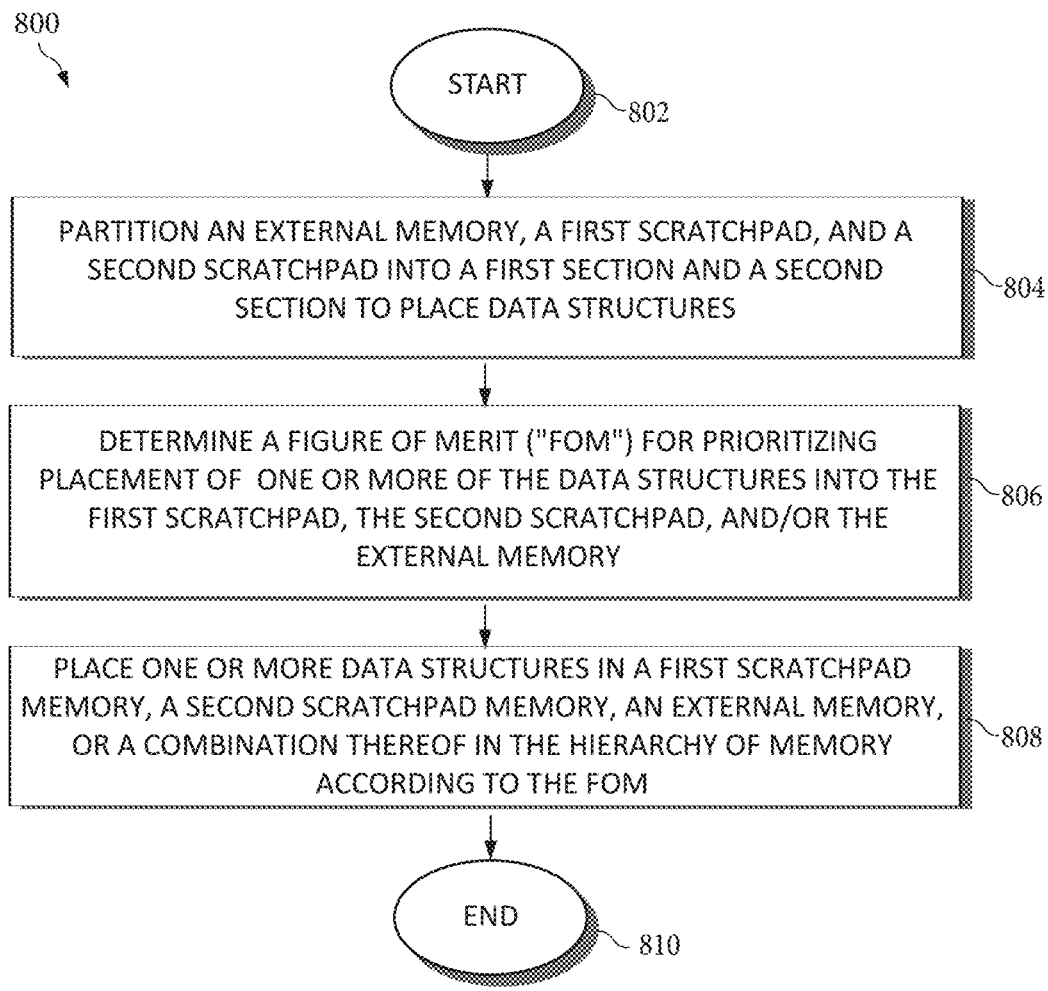
FIG. 8 is a flowchart diagram depicting an additional exemplary method for optimally placing data structures in an optimized hierarchy of memory in a computing environment by a processor, again in which aspects of the present invention may be realized.

Turning now to FIG. 8, an additional method 800 for optimally placing data structures in an optimized hierarchy of memory in a computing environment by a processor is depicted, in which various aspects of the illustrated embodiments may be implemented. The functionality 800 may be implemented as a method executed as instructions on a machine, where the instructions are included on at least one computer readable medium or one non-transitory machine-readable storage medium. The functionality 800 may start in block 802.

An external memory, a first scratchpad, and a second scratchpad may be partitioned into a first section and a second section to place data structures, as in block 804. A figure of merit ("FOM") may be determined for prioritizing placement of one or more of the data structures into the first scratchpad, the second scratchpad, and/or the external memory, as in block 806. One or more of the data structures may be placed in a first scratchpad memory, a second scratchpad memory, an external memory, or a combination thereof in the hierarchy of memory according to the FOM, as in block 808. The functionality 800 may end, as in block 810.

In one aspect, in conjunction with and/or as part of at least one block of FIG. 8, the operations of method 800 may include each of the following. The operations of method 800 may place one or more data structures in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step. The second scratchpad memory is positioned between the external memory and the first scratchpad memory at one or more intermediary layers.

The operations of method 800 may partition the second scratchpad into a plurality of accelerator core groups, wherein each accelerator core belonging to one of the plurality of accelerator core groups share a segment of the second scratchpad. The operations of method 800 may assign each accelerator core to the first scratchpad.

The operations of method 800 may also partition each of the external memory, the first scratchpad, and the second scratchpad into a first section to place static data structures and a second section to place temporal data structures, place static data structures into the first section, and/or place temporal data structures into the second section.

The operations of method 800 may place activation data structures into the first scratchpad, the second scratchpad, or the external memory according to a length of duration of the activation data structures.

The operations of method 800 may prioritize placement of the one or more data structures into the first scratchpad, the second scratchpad, and the external memory according to a figure of merit ("FOM"). The FOM may be defined as a combination of a plurality of factors, wherein the plurality of factors include at least a duration the one or more data structures should be retained as unused, a degree of memory boundness required for the one or more data structures, a positive impact or negative impact upon each of the operations that use the one or more data structures.

The operations of method 800 may place the one or more data structures into the first scratchpad according to the FOM of each of the one or more data structures, place the one or more data structures into the second scratchpad after the first scratchpad is full according to the FOM of each of the one or more data structures, and/or place the one or more data structures into the external memory after the first scratchpad, the second scratchpad, or a combination thereof are full according to the FOM of each of the one or more data structures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for optimized placement of data structures in a hierarchy of memory in a computing environment by a processor, comprising:
placing one or more data structures in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step in at least one of a plurality of steps in training a deep neural network (DNN), wherein the second scratchpad memory is positioned between the external memory and the first scratchpad memory at one or more intermediary layers;
partitioning each of the external memory, the first scratchpad, and the second scratchpad into a first section to place static data structures and a second section to place temporal data structures;
placing static data structures, required for all timesteps of the plurality of training steps, into the first section; and
placing temporal data structures, required for only some timesteps of the plurality of training steps, into the second section.

2. The method of claim 1, further including partitioning the second scratchpad into a plurality of accelerator core groups, wherein each accelerator core belonging to one of the plurality of accelerator core groups share a segment of the second scratchpad.

3. The method of claim 1, further including:
assigning each accelerator core to the first scratchpad; or
relaxing the one or more data structures the first scratchpad memory, the second scratchpad memory, the external memory, or a combination thereof based on a capacity level.

4. The method of claim 1, further including placing activation data structures into the first scratchpad, the second scratchpad, or the external memory according to a length of duration of the activation data structures.

5. The method of claim 1, further including prioritizing placement of the one or more data structures into the first scratchpad, the second scratchpad, and the external memory according to a figure of merit ("FOM"), wherein the FOM is one or more of a plurality of factors that include at least a duration the one or more data structures should be retained as unused, a degree of memory boundness required for the one or more data structures, and a positive impact or negative impact upon each of the operations that use the one or more data structures.

6. The method of claim 5, further including:
placing the one or more data structures into the first scratchpad according to the FOM of each of the one or more data structures;
placing the one or more data structures into the second scratchpad after the first scratchpad is full according to the FOM of each of the one or more data structures; or
placing the one or more data structures into the external memory after the first scratchpad, the second scratchpad, or a combination thereof are full according to the FOM of each of the one or more data structures.

7. A system for optimized placement of data structures in a hierarchy of memory in a computing environment, comprising:
one or more computers with executable instructions that when executed cause the system to:
place one or more data structures in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step, wherein the second scratchpad memory is positioned between the external memory and the first scratchpad memory at one or more intermediary layers;
partition each of the external memory, the first scratchpad, and the second scratchpad into a first section to place static data structures and a second section to place temporal data structures;
place static data structures, required for all timesteps of the plurality of training steps, into the first section; and
place temporal data structures, required for only some timesteps of the plurality of training steps, into the second section.

8. The system of claim 7, wherein the executable instructions partition the second scratchpad into a plurality of accelerator core groups, wherein each accelerator core belonging to one of the plurality of accelerator core groups share a segment of the second scratchpad.

9. The system of claim 7, wherein the executable instructions:
assign each accelerator core to the first scratchpad; or
relax the one or more data structures the first scratchpad memory, the second scratchpad memory, the external memory, or a combination thereof based on a capacity level.

10. The system of claim 7, wherein the executable instructions place activation data structures into the first scratchpad, the second scratchpad, or the external memory according to a length of duration of the activation data structures.

11. The system of claim 7, wherein the executable instructions prioritize placement of the one or more data structures into the first scratchpad, the second scratchpad, and the external memory according to a figure of merit ("FOM"), wherein the FOM is one or more of a plurality of factors that include at least a duration the one or more data structures should be retained as unused, a degree of memory boundness required for the one or more data structures, and a positive impact or negative impact upon each of the operations that use the one or more data structures.

12. The system of claim 11, wherein the executable instructions:
place the one or more data structures into the first scratchpad according to the FOM of each of the one or more data structures;
place the one or more data structures into the second scratchpad after the first scratchpad is full according to the FOM of each of the one or more data structures; or
place the one or more data structures into the external memory after the first scratchpad, the second scratchpad, or a combination thereof are full according to the FOM of each of the one or more data structures.

13. A computer program product for optimized placement of data structures in a hierarchy of memory by a processor in a computing environment, the computer program product comprising a non-transitory computer-readable storage medium having computer-readable program code portions stored therein, the computer-readable program code portions comprising:
an executable portion that places one or more data structures in a first scratchpad memory, a second scratchpad memory, an external memory, or a combination thereof in the hierarchy of memory according to a total memory capacity and bandwidth, a level of reuse of the one or more data structures, a number of operations that use each of the one or more data structures, a required duration each the one or more data structures are required to be placed a first scratchpad or a second scratchpad, and characteristics of those of the one or more data structures competing for placement in the hierarchy of memory that are able to co-exist at a same time step, wherein the second scratchpad memory is positioned between the external memory and the first scratchpad memory at one or more intermediary layers;
an executable portion that partitions each of the external memory, the first scratchpad, and the second scratchpad into a first section to place static data structures and a second section to place temporal data structures;
an executable portion that places static data structures, required for all timesteps of the plurality of training steps, into the first section; and
an executable portion that places temporal data structures, required for only some timesteps of the plurality of training steps, into the second section.

14. The computer program product of claim 13, further including an executable portion that partitions the second scratchpad into a plurality of accelerator core groups, wherein each accelerator core belonging to one of the plurality of accelerator core groups share a segment of the second scratchpad.

15. The computer program product of claim 13, further including an executable portion that:
assigns each accelerator core to the first scratchpad; or
relaxes the one or more data structures the first scratchpad memory, the second scratchpad memory, the external memory, or a combination thereof based on a capacity level.

16. The computer program product of claim 13, further including an executable portion that
places activation data structures into the first scratchpad, the second scratchpad, or the external memory according to a length of duration of the activation data structures.

17. The computer program product of claim 13, further including an executable portion that:
prioritize placement of the one or more data structures into the first scratchpad, the second scratchpad, and the external memory according to a figure of merit ("FOM"), wherein the FOM is defined as a combination of a plurality of factors, wherein the FOM is one or more of a plurality of factors that include at least a duration the one or more data structures should be retained as unused, a degree of memory boundness required for the one or more data structures, and a positive impact or negative impact upon each of the operations that use the one or more data structures.

18. The computer program product of claim 17, further including an executable portion that:
places the one or more data structures into the first scratchpad according to the FOM of each of the one or more data structures;
places the one or more data structures into the second scratchpad after the first scratchpad is full according to the FOM of each of the one or more data structures; or
places the one or more data structures into the external memory after the first scratchpad, the second scratchpad, or a combination thereof are full according to the FOM of each of the one or more data structures.

* * * * *